J. C. Daman,
Stump Elevator.
Nº 27,353.         Patented Mar. 6, 1860.
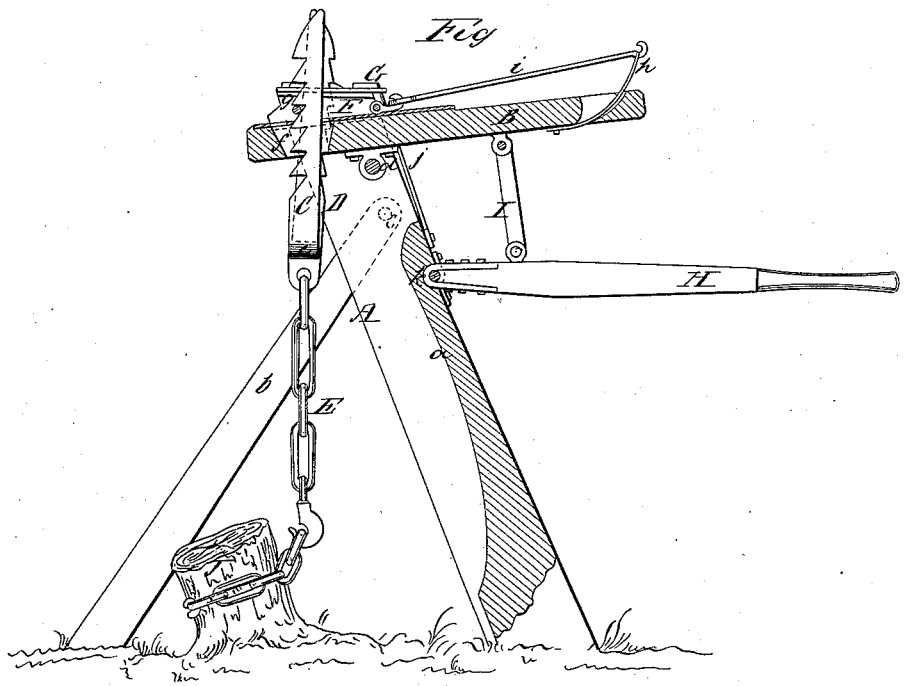
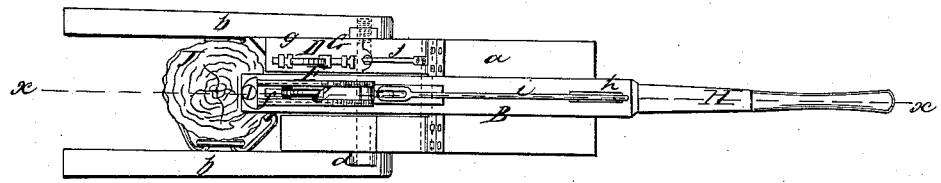
Witnesses        Inventor

UNITED STATES PATENT OFFICE.

JAMES C. DAMAN, OF HARTFORD, KENTUCKY.

MACHINE FOR EXTRACTING STUMPS.

Specification of Letters Patent No. 27,353, dated March 6, 1860.

*To all whom it may concern:*

Be it known that I, JAMES C. DAMAN, of Hartford, in the county of Ohio and State of Kentucky, have invented a new and Improved Device for Extracting Stumps of Trees from the Earth; and I do hereby declare that the following is a full, clear, and exact description of the same, reference being had to the annexed drawings, making a part of this specification, in which—

Figure 1, is a side sectional view of my invention taken in the line *x*, *x*, Fig. 2. Fig. 2, is a plan on top view of do.

Similar letters of reference indicate corresponding parts in the two figures.

To enable those skilled in the art to fully understand and construct my invention I will proceed to describe it.

A represents the framing of the machine, which consists of a short bar *a*, having two smaller bars *b*, *b*, connected by bolts *c*, *c*, at its upper end, the bars *b*, *b*, being allowed to work on bolts *c*, so that they and bar *a*, may be folded together when the machine is not in use or be distended, and the frame placed in an upright position when designed for use as shown clearly in Fig. 1.

In the upper part of the bar *a*, a rod or shaft *d*, is placed on which a lever B, is fitted and C, D, are two rack bars the lower ends of which are connected together as shown at *e*. To the lower ends of the rack bars a chain E, is attached. The rack bar C, passes through a mortise *f*, in the lever B, and the other bar D, passes through a plate *g*, on the upper end of the bar *a*.

On the upper surface of the lever B, a sliding frame or catch F, is placed, through which the rack bar C, passes, the frame or catch F, serving as a pawl and being retained in the rack bar by a spring *h*, which is attached to the lever B, and is connected to the slide by a rod *i*. On the plate *g*, a slide plate G, is placed, through which the rack bar D, passes, said plate also serving as a pawl which is retained in the rack bar by a spring *j*, attached to the bar *a*.

H, is a lever which is attached to the bar *a*, by a bolt *k*, and is allowed to work freely thereon. This lever H, is connected to the lever D, by a link I, as shown clearly in Fig. 1.

The operation is as follows:—The rack bars C, D, are let down until their catches F, G, catch into the uppermost notches of the bars C, D. The chain E, is then adjusted to the stump J, to be raised, and the operator grasps the lever H, and by depressing it causes a similar movement to be communicated to the lever B, in consequence of the link I, connecting the two levers. As the lever B, is depressed, the rack bars C, D, are raised in consequence of the catch or slide frame F, on lever B, catching into rack bar C, and of course the chain E, will draw on the stump J, the rack bars C, D, being raised one notch at the depression of the lever H. The lever H, is then raised until the catch or slide frame F, passes under the notch below for a succeeding pull, the rack bar D, and catch or slide plate G, retaining the stump while the lever H, is raised to allow its catch or frame F, to pass under a notch farther down in the bar C. The rack bar D, it will be seen is a retaining bar, its catch G, being a retaining catch, the stump being pulled, or the power being applied to it through the medium of the levers H, B, catch or slide frame F, and rack bar D. The rack bars C, D, therefore it will be seen, are raised the distance of a notch at each depression of the lever H, and when the rack bars are fully raised, if the stump be not extracted, an additional chain may be attached and the stump retained until the rack bars C, D, are lowered for a succeeding lift or pull.

It might be supposed that the common spring pawl would answer equally as well as the sliding frames F, G; but practically such is not the case. In my early experiments I used spring pawls but was compelled to abandon them. I found that the pawls would hold the bars too rigidly, causing them to bend and break, thus rendering the machine utterly useless. Experiment satisfied me that a yielding fastening was absolutely essential to the practical success of the machine, and I at last invented the sliding frames. When the spring pawls are used, it is impossible to place any great strain on the machine without bending or breaking the bars and thus rendering the machine useless; large stumps therefore cannot be extracted. But by the use of the sliding frames the machine may be subjected to the severest tests, but always operates with success; for in pulling large stumps, for example, the slide will yield on the short lever until the pulling bar assumes a straight line and throws all its weight across the pin on the slide.

I am aware that levers, rack bars, and pawls have been arranged in various ways for the purpose of extracting stumps, and I do not claim separately any of the parts herein shown and described; but,

Having thus described my invention, what I claim as new and desire to secure by Letters Patent, is,

The arrangement and combination of the connected bar C, D, the rod (*i*) sliding frames F, G, springs (*h*) (*j*) link I, and lever H, as and for the purpose herein shown and described.

JAMES C. DAMAN.

Witnesses:
W. H. MILLER,
LARKIN NALL.